United States Patent Office 3,526,675
Patented Sept. 1, 1970

3,526,675
DEHYDROGENATION OF ORGANIC COMPOUNDS
Louis J. Croce, Seabrook, Tex., and Laimonis Bajars, Princeton, N.J., assignors to Petro-Tex Chemical Corporation, Houston, Tex., a corporation of Delaware
No Drawing. Continuation-in-part of application Ser. No. 459,878, May 28, 1965. This application Sept. 28, 1967, Ser. No. 671,227
Int. Cl. C07c 5/18
U.S. Cl. 260—680                                     9 Claims

ABSTRACT OF THE DISCLOSURE

Oxidative dehydrogenation of organic compounds in vapor phase in the presence of a catalyst containing oxygen, iron and manganese. The preferred catalyst comprises manganese ferrite.

CROSS REFERENCE TO RELATED APPLICATION

This application is a continuation-in-part of copending application Ser. No. 459,878, filed May 28, 1965, and entitled Chemical Process.

BACKGROUND OF THE INVENTION

Field of the invention

This application relates to the oxidative dehydrogenation of organic compounds in the vapor phase in the presence of compositions containing oxygen, iron and manganese. For instance, hydrocarbons may be dehydrogenated by passing a mixture of hydrocarbon and oxygen over a composition comprising manganese ferrite.

Description of the prior art

Organic compounds may be dehydrogenated by contacting the compound to be dehydrogenated at elevated temperatures in the presence of various catalysts. These processes are known as catalytic dehydrogenation because the catalysts catalyze the removal of hydrogen from the molecule. Numerous catalysts have been suggested such as in U.S. 2,442,131, May 25, 1948.

In recent years interest has been shown in processes known as oxidative dehydrogenation processes. In these processes the organic compound to be dehydrogenated is contacted with oxygen and optionally halogen with certain catalysts. Examples of these processes may be found in U.S. 3,207,805 through U.S. 3,207,811, Sept. 21, 1965.

SUMMARY OF THE INVENTION

According to this invention organic compounds are dehydrogenated by an oxidative dehydrogenation process. The catalysts of this invention contain iron, oxygen and manganese. The catalysts are crystalline compositions of iron, oxygen, and manganese. The catalysts may be ferrites and/or spinels. A preferred class of organic compounds to be dehydrogenated is hydrocarbons.

DESCRIPTION OF THE PREFERRED EMBODIMENT(S)

The total number of atoms of manganese should preferably be from about .05 to 2.0 atoms per atom of iron and preferably will be from or about .20 to 1.0 atom per atom of iron, with a particularly preferred ratio of .35 to .6 atom per atom of iron.

A preferred type of catalyst of this type is that having a face-centered cubic form of crystalline structure. Examples of this type of catalyst are ferrites of the general formula $MnO \cdot Fe_2O_3$.

It is not necessary that the catalysts contain all of the iron or the manganese in a crystalline structure. The catalysts may contain an excess of either iron or manganese over that which will form a crystalline structure. An example of this would be where manganese ferrite contained or was combined with $Fe_2O_3$. It is also possible for the defined ingredients to be partially present as interstitial components, or as substitutional components in solid solution with the normal crystalline structure, rather than being in the normal crystalline structure. It is not necessary that the ingredients not contained in the crystalline structure be in solution with the crystalline structure as the catalysts may comprise a combination of crystals and/or solutions of other ingredients, and/or physical mixtures of other ingredients; this is true of ingredients either having the same or different compositions as that of the crystal. Precipitates from solid solution may also be included in the catalyst. The catalysts of this invention may contain iron combined in another form. For instance, manganese ferrite may be mixed with or combined with a ferrite of magnesium, zinc, nickel, cobalt or cadmium ferrite. However, at least 50 weight percent and preferably greater than 50 weight percent of any ferrite should be manganese ferrite. Suitably the catalysts of this invention will comprise at least 60 weight percent manganese ferrite based on the total ferrite present.

The valency of the metals in the catalysts do not have to be any particular values, although certain combinations are preferred as disclosed elsewhere. The determination of the valency of the ions is sometimes difficult and the results are uncertain. The different ions may exist in more than one valency state.

Valuable catalysts were produced comprising as the main active constituent in the catalyst surface exposed to the reaction gases, iron, oxygen and manganese. The preferred catalysts are the ferrites. Preferred catalysts will have iron in the catalyst surface in an amount from 20 to 95 and preferably from 30 to 90 weight percent of the total weight of iron and manganese.

The preferred manganese ferrite is the ferrite having a cubic face-centered configuration, such as the spinel. Ordinarily the manganese ferrites will not be present in the most highly oriented crystalline structure, because it has been found that superior results may be obtained with catalysts wherein the crystalline structure of the manganese ferrite is relatively disordered. The desired catalysts may be obtained by conducting the reaction to form the manganese ferrite at relatively low temperatures, that is, at temperatures lower than some of the very high temperatures used for the formation of manganese ferrites prepared for semi-conductor applications. Included in the definition of ferrites are the so-called intermediate oxides. Generally, the temperature of reaction for the formation of the catalysts comprising manganese ferrite will be less than 1300° C. and preferably less than 1150° C. The reaction time at the elevated temperature in the formation of the catalysts may preferably be from about 5 minutes to 4 hours at elevated temperatures high enough to cause formation of the manganese ferrite but less than about 1150° C. Any iron not present in the form of the ferrite will desirably be present predominantly as gamma iron oxide. The alpha iron oxide will preferably be present in an amount of no greater than 40 weight percent of the catalytic surface, such as no greater than about 30 weight percent. The preferred catalysts will have as the most intense X-ray diffraction peak a peak within the range of 2.50 to 2.59, and more preferably another peak of from 1.47 to 1.53. The preferred catalysts will have surfaces generally having X-ray diffraction reflection peaks at d spacings within or about 4.87 to 4.93, 2.97 to 3.03, 2.53 to 2.59, 2.09 to 2.15, 1.70 to 1.76, 1.61 to 1.67 and 1.47 to 1.53, with the most intense peak being between 2.52 to 2.59. Suitable preferred ferrite catalysts are manganese ferrite with X-ray diffraction peaks within 4.87 to 4.94, 2.97 to 3.03, 2.53 to 2.59, 2.42 to 2.48, 2.09 to 2.15, 1.71 to 1.75, 1.62 to 1.66, 1.48 to 1.52, with the most intense peak being between 2.53 to 2.59.

The catalysts of this invention may also comprise phosphorus as an additive. The phosphorus should be present in an amount of from or about 0.2 to 16 weight percent phosphorus, based on the total weight of the atoms of iron and the second metallic ingredient(s). The catalysts of this invention may also contain silicon as an additive.

The catalysts may be prepared in a number of ways. The ferrites, spinels, and so forth, of this invention may be prepared by known methods. The catalytic composition may be extruded into catalytic particles, compressed from dry ingredients, coated on a carrier, and so forth. The iron and manganese may be incorporated using starting compounds such as oxides, nitrates, hydroxides, hydrates, oxalates, carbonates, acetates, halides, and so forth. Excellent catalysts are obtained by using salts of the elements. The catalysts of this invention will be used in the form of inorganic oxides for the dehydrogenation reaction. This definition means that the catalysts are inorganic and contain oxygen; included in this definition are the ferrites. However, as pointed out, the catalysts may be produced from organic precursors such as the acetates, and the crystalline structure may be formed in situ during the dehydrogenation reaction.

The process of this invention may be applied to the dehydrogenation of a great variety of organic compounds to obtain the corresponding unsaturated derivative thereof. Such compounds normally will contain from 2 to 20 carbon atoms, at least one

grouping, a boiling point below about 350° C., and such compounds may contain other elements, in addition to carbon and hydrogen such as oxygen, halogens, nitrogen and sulphur. Preferred are compounds having from 2 to 12 carbon atoms, and especially preferred are compounds of 2 to 6 or 8 carbon atoms.

Among the types of organic compounds which are successfully dehydrogenated to the corresponding unsaturated derivative by means of the novel process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustration dehydrogenations include propionitrile to acrylonitrile, propionaldehyde to acrolein, ethyl chloride to vinyl chloride, methyl isobutyrate to methyl methacrylate, 2,3 dichlorobutane to chloroprene, ethyl pyridine to vinyl pyridine, ethylbenzene to styrene, isopropylbenzene to α-methyl styrene, ethylcyclohexane to styrene; cyclohexane to benzene, ethane to ethylene, propane to propylene, isobutane to isobutylene, n-butane to butene and butadiene-1,3, butene to butadiene-1,3, n-butane to vinyl acetylene, methyl butene to isoprene, cycloheptane to cyclopentene and cyclopentadiene-1,3, n-octane to ethyl benzene and ortho-xylene, mono-methylheptanes to xylenes, propane to propylene to benzene, ethyl acetate to vinyl acetate, 2,4,4-trimethylpentane to xylenes, and the like. This invention may be useful for the formation of new carbon to carbon bonds by the removal of hydrogen atoms such as the formation of carbocyclic compound from two aliphatic hydrocarbon compounds or the formation of a dicyclic compound from a monocyclic compound having an acyclic group. Examples of conversions are the conversion of n-heptane to toluene and propene to diallyl. Representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride, 2,3 dichlorobutane, 1,3 dichlorobutane, 1,4 dichlorobutane, the chlorofluoroethanes, methyl pentane, methylethyl ketone, diethyl ketone, n-butyl alcohol, methyl propionate, and the like. This invention is particularly adapted to the preparation of vinylidene compounds containing at least one $CH_2=C$ group, that is, a group containing a terminal methylene group attached by a double bond to a carbon atom, and having 2 to 12 carbon atoms by the dehydrogenation of compounds of the formula $CH_3-CH_2-R$ wherein R is an organic radical of from 0 to 10 carbon atoms, preferably a hydrocarbon. Similarly, acetylenic compounds of the formula $CH\equiv C-$ may be produced from the same starting materials.

Preferably oxygen is present in vapor phase, suitably in an amount within the range of 0.2 to about 5.0 mols of oxygen per mol of organic compound to be dehydrogenated, preferably from 0.2 to 2.5 mols per mol and more preferably between about 0.25 and about 1.6 mols of oxygen per mol of organic compound to be dehydrogenated, such as between 0.35 and 1.2 mols of oxygen. One method for furnishing the oxygen is to feed oxygen to the reactor as pure oxygen, as air, as oxygen-enriched air, oxygen mixed with diluents, and so forth. Based on the total gaseous mixture present in the reactor, good results are obtained with oxygen present in an amount from about 0.5 to 25 volume percent of the total gaseous mixture, such as in an amount from about 1 to 15 volume percent of the total. Sometimes it has been found desirable to add the oxygen in increments, such as to different sections of the reactor. The above described proportions of oxygen employed are based on the total amount of oxygen present in the reactor. The oxygen may be added directly to the reactor or it may be premixed, for example, with a diluent or steam.

It is one of the advantages of this invention that halogen may also be added to the reaction gases to give excellent results. The addition of halogen to the feed is particularly effective when the hydrocarbon to be dehydrogenated is saturated. The halogen fed to the dehydrogenation zone may be either elemental halogen or any compound of halogen which would liberate halogen under the conditions of reaction. Suitable sources of halogen are such as hydrogen iodide, hydrogen bromide and hydrogen chloride; aliphatic halides, such as ethyl iodide, methyl bromide, 1,2-dibromo ethane, ethyl bromide, amyl bromide, and allyl bromide; cycloaliphatic halides, such as cyclohexylbromide; aromatic halides, such as benzyl bromide; halohydrins, such as ethylene bromohydrin; halogen substituted aliphatic acids, such as bromoacetic acid; ammonium iodide; ammonium bromide; ammonium chloride; organic amine halide salts, such as methyl amine hydrobromide; and the like. Mixtures of various sources of halogen may be used. The preferred sources of halogen are iodine, bromine, and chlorine, and compounds thereof, such as hydrogen bromide, hydrogen iodide, hydrogen chloride, ammonium bromide, ammonium iodide, ammonium chloride, alkyl halides of one to six carbon atoms and mixtures thereof, with the iodine and bromine compounds being particularly preferred and the best results having been obtained with ammonium iodide, bromide, or chloride. When terms such as halogen liberating materials or halogen materials are used in the specification and claims, this includes any source of halogen such as elemental halogens, hydrogen halides, or ammonium halides. The amount of halogen, calculated as elemental halogen, may be as little as about 0.0001 or less mol of halogen per mol of the organic compound to be dehydrogenated to as high as 0.2 or 0.5. The preferred range is from about 0.001 to 0.09 mol of halogen per mol of the organic compound to be dehydrogenated.

The temperature for the dehydrogenation reaction generally will be at least about 250° C., such as greater than about 300° C. or 375° C., and the maximum temperature in the reactor may be about 650° C. or 750° C. or perhaps higher under certain circumstances. However, excellent results are obtained within the range of or about 300° C. to 575° C., such as from or about 325° C. to or about 525° C. The temperatures are measured at the maximum temperature in the reactor. An advantage of this invention is that lower temperatures of dehydrogenation may be utilized than are possible in conventional dehydrogenation processes. Another advantage is that large quantities of heat do not have to be added to the reaction as was previously required.

The dehydrogenation reaction may be carried out at atmospheric pressure, superatmospheric pressure or at sub-atmospheric pressure. The total pressure of the system will normally be about or in excess of atmospheric pressure, although sub-atmospheric pressure may also desirably be used. Generally, the total pressure will be between about 4 p.s.i.a. and about 100 or 125 p.s.i.a. Preferably, the total pressure will be less than about 75 p.s.i.a. and excellent results are obtained at about atmospheric pressure.

The initial partial pressure of the organic compound to be dehydrogenated will preferably be equivalent to equal to or less than one-half atmosphere at a total pressure of one atmosphere. Generally, the combined partial pressure of the organic compound to be dehydrogenated, together with the oxygen, will also be equivalent to less than one-half atmosphere at a total pressure of one atmosphere. Preferably, the initial partial pressure of the organic compound to be dehydrogenated will be equivalent to no greater than one-third atmosphere or no greater than one-fifth atmosphere at a total pressure of one atmosphere. Also, preferably, the initial partial pressure of the combined organic compound to be dehydrogenated plus the oxygen will be equivalent to no greater than one-third or no greater than one-fifth atmosphere at a total pressure of one atmosphere. Reference to the initial partial pressure of the organic compound to be dehydrogenated means the partial pressure of the organic compound as it first contacts the catalytic particles. An equivalent partial pressure at a total pressure of one atmosphere means that one atmosphere total pressure is a refeernce point and does not imply that the total pressure of the reaction must be operated at atmospheric pressure. For example, in a mixture of one mol of ethyl chloride, three mols of steam, and one mol of oxygen under a total pressure of one atmosphere, the ethyl chloride would have an absolute pressure of one-fifth of the total pressure, or roughly six inches of mercury absolute pressure. Equivalent to this six inches of mercury absolute pressure at atmospheric pressure would be ethyl chloride mixed with oxygen under a vacuum such that the partial pressure of the ethyl chloride is 6 inches of mercury absolute. The combination of a diluent such as nitrogen, together with the use of a vacuum, may be utilized to achieve the desired partial pressure of the organic compound. For the purpose of this invention, also equivalent to the six inches of mercury ethyl chloride absolute pressure at atmospheric pressure would be the same mixture of one mol of ethyl chloride, three mols of steam, and one mol of oxygen under a total pressure greater than atmospheric, for example, a total pressure of 20 p.s.i.a. Thus, when the total pressure in the reaction zone is greater than one atmosphere, the absolute values for the pressure of the organic compound to be dehydogenated will be increased in direct proportion to the increase in direct proportion to the increase in total pressure above one atmosphere.

The partial pressures described above may be maintained by the use of diluents such as nitrogen, helium or other gases. Conveniently, the oxygen may be added as air with the nitrogen acting as a diluent for the system. Mixtures of diluents may be employed. Volatile compounds which are not dehydrogenated or which are dehydrogenated only to a limited extent may be present as diluents.

Preferably, the reaction mixture contains a quantity of steam, with the range generally being between about 2 and 40 mols of steam per mol of organic compound to be dehydrogenated. Preferably, steam will be present in an amount from about 3 to 35 mols per mol of organic compound to be dehydrogenated and excellent results have been obtained within the range of about 5 to about 30 mols of steam per mol of organic compound to be dehydrogenated. The functions of the steam are several-fold, and the steam may not merely act as a diluent. Diluents generally may be used in the same quantities as specified for the steam. Excellent results are obtained when the gaseous composition fed to the reactor consists essentially of the organic compound to be dehydrogenated, inert diluents, and oxygen as the sole oxidizing agent.

The gaseous reactants may be conducted through the reaction chambers at a fairly wide range of flow rates. The optimum flow rate will be dependent upon such variables as the temperature of reaction, pressure, particle size, and whether a fluid bed or fixed bed reactor is utilized. Desirable flow rates may be established by one skilled in the art. Generally, the flow rates will be within the range of about 0.10 to 25 liquid volumes of the organic compound to be dehydrogenated per volume of reactor containing catalyst per hour (referred to as LHSV), wherein the volumes of organic compounds are calculated at standard conditions of 0° C. and 760 mm. of mercury. Usually, the LHSV will be between 0.15 and about 5 or 10. For calculation, the volume of reactor containing catalyst is that volume of reactor space including the volume displaced by the catalyst. For example, if a reactor has a particular volume of cubic feet of void space, when that void space is filled with catalyst particles, the original void space is the volume of reactor containing catalyst for the purpose of calculating the flow rate. The gaseous hourly space velocity (GHSV) is the volume of the organic compound to be dehydrogenated in the form of vapor calculated under standard conditions of 0° C. and 760 mm. of mercury per volume of reactor space containing catalyst per hour. Generally, the GHSV will be between about 25 and 6400, and excellent results have been obtained between about 38 and 3800. Suitable contact times are, for example, from about 0.001 or higher to about 4 or 10 or 20 seconds, with particularly good results being obtained between 0.01 and 5 seconds. The contact time is the calculated dwell time of the reaction mixture in the reaction zone, assuming the mols of product mixture are equivalent to the mols of feed mixture. For the purpose of calculation of contact times, the reaction zone is the portion of the reactor containing catalyst which is at a temperature of at least 250° C.

The catalytic surface described is the surface which is exposed in the dehydrogenation zone to the reactor; that is, if a catalyst carrier is used, the composition described as a catalyst refers to the composition of the surface and not to the total composition of the surface coating plus carrier. Catalyst binding agents or fillers may be used, but these will not ordinarily exceed about 50 percent or 60 percent by weight of the catalytic surface. These binding agents and fillers will preferably be essentially inert. Preferred catalysts are those that have as a catalytic surface exposed to the reaction gases at least 25 or preferably 50 weight percent of the defined catalytic surface. Also preferably iron will constitute at least 50 atomic weight percent of the cations in the catalytic surface. Suitable catalysts are those which do not contain sodium or potassium as an additive in the crystal structure, such as those containing less than 5 or less than 2 percent by weight of sodium or potassium based on the total weight of the catalyst. This is particularly true for processes that do not utilize halogen in the gaseous feed to the reactor.

The catalyst will by definition be present in a catalytic amount. The amount of catalyst will ordinarily be present in an amount greater than 10 square feet of catalyst surface per cubic foot of reaction zone containing catalyst. Of course, the amount of catalyst may be much greater, particularly when irregular surface catalysts are used. When the catalyst is in the form of particles, either supported or unsupported, the amount of catalyst surface may be expressed in terms of the surface area per unit weight of any particular volume of catalyst particles. The ratio of catalytic surface to weight will be dependent upon various factors, including the particle size, particle size distribution, apparent bulk density of the particles, amount of active catalyst coated on the carrier, density of the carrier, and so forth. Typical values for the surface to weight ratio are such as about one-half to 200 square meters per gram, although higher and lower values may be used.

The dehydrogenation reactor may be of the fixed bed or fluid bed type. Conventional reactors for the production of unsaturated organic compounds by dehydrogenation are satisfactory. Excellent results have been obtained by packing the reactor with catalyst particles as the method of introducing the catalytic surface. The catalytic surface may be introduced as such or it may be deposited on a carrier by methods known in the art such as by preparing an aqueous solution or dispersion of a catalytic material and mixing the carrier with the solution or dispersion until the active ingredients are coated on the carrier. If a carrier is utilized, very useful carriers are silicon carbide, aluminum oxide, magnesia, pumice, and the like. Other known catalyst carriers may be employed. When carriers are used, the amount of catalyst on the carrier will suitably be between about 5 to 75 weight percent of the total weight of the active catalytic material plus carrier. Another method for introducing the required surface is to utilize as a reactor a small diameter tube wherein the tube wall is catalytic or is coated with catalytic material. Other methods may be utilized to introduce the catalytic surface such as by the use of rods, wires, mesh, or shreds, and the like, of catalytic material.

According to this invention, the catalyst may be autoregenerative and the process may be continuous. Moreover, small amounts of tars and polymers are formed as compared to some prior art processes.

In the following examples will be found specific embodiments of the invention and details employed in the practice of the invention. Percent conversion refers to the mols of organic compound to be dehydrogenated that is consumed, based on the mols of the said organic compound fed to the reactor, percent selectivity refers to the mols of product formed based on the mols of the said organic compound consumed, and percent yield refers to the mols of product formed based on the mols of the said organic compound fed.

EXAMPLE 1

Manganese ferrite is prepared by reacting $MnCO_3$ and $Fe_2O_3$. 80.5 grams of $MnCO_3$ and 111.8 grams of $Fe_2O_3$ are dispersed in 400 cc. of water and blended for 15 minutes. The mixture is then filtered and dried. The dried mixture is reacted at 800° C. for two hours in air to form manganese ferrite. The product is cooled in air at 130° C. Butene-2 is dehydrogenated to butadiene-1,3 employing the manganese ferrite. Oxygen is fed as air in an amount equivalent to 0.6 mol of oxygen per mol of butene-2. Steam is employed in an amount of 30 mol of steam per mol of butene-2. A fixed bed reactor is used with the liquid hourly space velocity of butene-2 being 1.0. The maximum temperature in the reactor is 400° C. The conversion of butene-2 is 47 mol percent, the selectivity to butadiene is 84 mol percent for a yield of 40 mol percent butadiene-1,3.

EXAMPLE 2

Isoprene is formed by the dehydrogenation of a mixture of 80 mol percent 2-methyl butene-1 and 20 mol percent methyl butane. The manganese ferrite catalyst is formed by reacting MnO and $Fe_2(CO_3)_3$ in equimolar quantities at 900° C. in air for 2½ hours. The catalyst is used as a fixed bed and the flow rate of the hydrocarbon mixture is 1.0 liquid hourly space velocity. The maximum temperature in the reactor is 460° C. A mixture of 15 mols of nitrogen and 15 mols of steam is employed as a diluent.

We claim:
1. A process for the oxidative dehydrogenation of organic compounds in vapor phase which comprises feeding to a dehydrogenation reactor which is at an elevated temperature of at least about 250° C. a mixture of the said organic compound and oxygen in an amount of at least about 0.20 mol of oxygen per mol of organic compound, said dehydrogenation reactor having a catalyst having as its main active constituents iron, oxygen and manganese and comprising manganese ferrite.

2. The method of claim 1 wherein the iron in the catalyst surface is present in an amount from 30 to 90 weight percent based on the total weight of iron and manganese in the catalyst surface.

3. The process of claim 1 wherein the said vapor phase contains a halogen.

4. A process for the oxidative dehydrogenation of hydrocarbon compounds having at least two carbon atoms which comprises feeding to a dehydrogenation reactor which contains a catalyst at a temperature of greater than 250° C. a mixture of the said hydrocarbon compound to be dehydrogenated and from 0.2 to 2.5 mols of oxygen per mol of the said hydrocarbon compound with the said catalyst having as its main active constituent iron, oxygen and manganese and comprising manganese ferrite to produce a dehydrogenated hydrocarbon product.

5. A process for the oxidative dehydrogenation of organic compounds having at least four carbon atoms which comprises feeding to a dehydrogenation reactor which contains a catalyst at a temperature of greater than 325° C. a mixture of the said organic compound to be dehydrogenated, from 0.2 to 2.5 mols of oxygen per mol of the said organic compound and from 2 to 40 mols of steam per mol of the said organic compound with the said reactor containing a catalyst having as its main active constituent iron, oxygen and manganese and comprising manganese ferrite.

6. The process of claim 1 wherein the said composition additionally contains phosphorus.

7. The process of claim 1 wherein the said composition is present as a fixed bed and oxygen is fed to the reactor with the reaction gases in an amount of at least 0.25 mol of oxygen per mol of organic compound to be dehydrogenated.

8. The process of claim 1 wherein n-butene is dehydrogenated to butadiene-1,3.

9. The process of claim 1 wherein methyl pentene is dehydrogenated to isoprene.

References Cited

UNITED STATES PATENTS 3,207,811   9/1965   Bajars.
3,270,080   8/1966   Christmann.
3,338,952   8/1967   Callahan et al.

PAUL M. COUGHLAN, Jr., Primary Examiner

U.S. Cl. X.R.

252—471; 260—696

UNITED STATES PATENT OFFICE
Certificate

Patent No. 3,526,675                                Patented September 1, 1970

Louis J. Croce and Laimonis Bajars

Application having been made by Louis J. Croce and Laimonis Bajars, the inventors named in the patent above identified, and Petro-Tex Chemical Corporation, Houston, Texas, a corporation of Delaware, the assignee, for the issuance of a certificate under the provisions of Title 35, Section 256, of the United States Code, adding the name of Maigonis Gabliks as a joint inventor, and a showing and proof of facts satisfying the requirements of the said section having been submitted, it is this 9th day of March 1971, certified that the name of the said Maigonis Gabliks is hereby added to the said patent as a joint inventor with the said Louis J. Croce and Laimonis Bajars.

FRED W. SHERLING
*Associate Solicitor.*